(12) United States Patent
Kume et al.

(10) Patent No.: US 7,178,316 B2
(45) Date of Patent: Feb. 20, 2007

(54) ULTRASONIC SEALING APPARATUS

(75) Inventors: Satoshi Kume, Tokushima-ken (JP); Mitsuhiko Shinohara, Tokushima-ken (JP); Takeshi Iseki, Tokushima-ken (JP); Michio Ueda, Tokushima-ken (JP)

(73) Assignee: Shikoku Kakoki Co., Ltd., Tokushima-ken (JP)

( * ) Notice: Subject to any disclaimer, the term of this patent is extended or adjusted under 35 U.S.C. 154(b) by 1038 days.

(21) Appl. No.: 10/269,057

(22) Filed: Oct. 11, 2002

(65) Prior Publication Data

US 2003/0046906 A1   Mar. 13, 2003

Related U.S. Application Data

(63) Continuation of application No. 09/671,347, filed on Sep. 27, 2000, now abandoned.

(30) Foreign Application Priority Data

Sep. 30, 1999   (JP)   ................ 11-279917

(51) Int. Cl.
B65B 51/10   (2006.01)
(52) U.S. Cl. .............. 53/477; 53/373.7; 53/374.2; 53/552; 156/580.2
(58) Field of Classification Search ............ 156/73.1, 156/73.3, 251, 69, 308.4, 309.6, 580.1, 580.2, 156/466, 157, 380.5; 53/373.2, 373.7, 374.2, 53/375.3, 552, DIG. 2
See application file for complete search history.

(56) References Cited

U.S. PATENT DOCUMENTS

| | | | | |
|---|---|---|---|---|
| 3,468,731 A | * | 9/1969 | Obeda | ............ 53/374.2 |
| 4,117,306 A | | 9/1978 | Shah | |
| 4,135,957 A | * | 1/1979 | Voller | ............ 156/157 |
| 4,251,303 A | * | 2/1981 | Deimel et al. | ............ 53/374.2 |
| 4,517,790 A | * | 5/1985 | Kreager | ............ 53/373.7 |
| 4,534,818 A | * | 8/1985 | Kreager et al. | ............ 156/466 |
| 4,580,392 A | * | 4/1986 | Lagerstedt et al. | ............ 53/552 |
| 4,630,429 A | * | 12/1986 | Christine | ............ 53/375.3 |
| 4,767,492 A | * | 8/1988 | Fukusima et al. | ............ 53/373.7 |
| 5,250,140 A | * | 10/1993 | Hayashi et al. | ............ 156/380.5 |
| 5,649,407 A | * | 7/1997 | Blomqvist | ............ 53/374.8 |

(Continued)

FOREIGN PATENT DOCUMENTS

DE   12 79 320   10/1968

(Continued)

Primary Examiner—Louis K. Huynh
Assistant Examiner—Thanh Truong
(74) Attorney, Agent, or Firm—Ann S. Hobbs; Robert Kinberg; Venable LLP

(57) ABSTRACT

An ultrasonic sealing apparatus is provided for transversely ultrasonically sealing a packing material comprised of a laminated body including at least a thermoplastic resin layer having a tubular form and containing a fluid. The apparatus includes a horn having an elongated and flat sealing face and an opposing jaw with an action face including a pressing portion for pressing the packing material in cooperation with the sealing face of the horn to a define at least one transverse sealing zone of the tubular packing material. At least one groove is disposed on the action face of the opposing jaw for forming a molten thermoplastic resin bulge in a vicinal area of the at least one sealing zone on a side in contact with the fluid in the tubular packing material.

16 Claims, 4 Drawing Sheets

U.S. PATENT DOCUMENTS 6,482,291 B1 * 11/2002 Kume et al. .............. 156/580.2

FOREIGN PATENT DOCUMENTS

| | | |
|---|---|---|
| DE | 14 79 511 | 7/1969 |
| DE | 16 04 580 | 11/1970 |
| FR | 1 031 672 | 6/1953 |
| FR | 2 079 944 | 12/1971 |
| GB | 1 120 881 | 7/1968 |
| JP | 56-92046 | 7/1981 |
| JP | 58-134744 | 8/1983 |
| JP | 62-22784 | 5/1987 |
| JP | 63-147408 | 9/1988 |
| JP | 5-269854 | 10/1993 |
| JP | 6-15741 | 1/1994 |
| JP | 3004786 | 9/1994 |
| JP | 7-2231 | 1/1995 |
| JP | 7-33121 | 2/1995 |
| JP | 7-164523 | 6/1995 |
| JP | 2544450 | 7/1996 |
| JP | 8-230834 | 9/1996 |
| JP | 8-244728 | 9/1996 |
| JP | 9-240607 | 9/1997 |
| WO | 99/48759 | 9/1999 |

* cited by examiner

ULTRASONIC SEALING APPARATUS

CROSS REFERENCE TO RELATED APPLICATIONS

This application is a continuation of U.S. application Ser. No. 09/671,347 filed Sep. 27, 2000 now abandoned and claiming priority with respect to Japanese Application No. 279917/1999 filed Sep. 30, 1999, in the Japanese Patent Office, the disclosures of both foregoing applications being incorporated herein by reference.

BACKGROUND OF THE INVENTION

1. Field of the Invention

The present invention relates to an ultrasonic sealing apparatus for use in a filling/packing machine for producing liquid beverages or the like, which are packed in paper containers so that they can be stored for a long time, and more particularly to an ultrasonic sealing apparatus provided with an opposing jaw having an action face of a specific shape for improving sealability by controlling molten thermoplastic resin flow.

2. Description of the Related Art

Hitherto, there has been known a filling/packing machine, as a whole shown in FIG. 1, in which a sterilized packing material web is used for a rectangular parallelepiped packing container filled with a liquid, such as a juice. In brief, such a filling/packing machine as a whole comprises a reel 2 supporting a laminated packing material web 1 in a rolled state; a sterilization device 3 for sterilizing the tubular laminated packing material web successively unwound from the reel; a longitudinal sealing section 4 for sealing both longitudinal end portions of the sterilized laminated packing material web and thereby forming a tubular laminated packing material web; a liquid supply tube 5 for filling a fluid content into the web formed into the tubular form; a transverse sealing apparatus 7 for transversely sealing the tubular laminated packing material web in the direction perpendicular to the longitudinal direction thereof in the presence of a fluid while feeding downward the tube filled with the content by the length substantially corresponding to one package, and at the same time, continuously forming a pillow-shaped container 6 which is rectangular in section; and a container shaping device for forming the pillow-shaped containers 6 into rectangular parallelepiped containers 8 by folding the end portions to make the final form. The transverse sealing device 7 is composed of a sealing unit, a sealing jaw for fixing the sealing unit, and a driving means for driving the sealing jaw.

Such a sealing apparatus may comprise an ultrasonic sealing device in the form of a piezoelectric driving unit with a piezoelectric ceramic plate or a magnetostriction driving unit, which is connected to an AC supply source, and a horn with an elongated sealing surface, with one or more reaction bodies forming a half wavelength together with the horn (Japanese Laid-Open Patent Application No. 2231/1995). In addition, other ultrasonic sealing apparatuses are known, for example as disclosed in Japanese Patent Publication No. 22784/1987, Japanese Patent Publication No. 2544450/1996, Japanese Laid-Open Patent Application No. 33121/1995, Japanese Laid-Open Patent Application No. 92046/1981, Japanese Laid-Open Patent Application No. 15741/1994, and the like).

Among the other ultrasonic sealing apparatuses, there has been known an ultrasonic sealing apparatus for liquid containers that is characterized by the shape of the action face of the opposing jaw for pressing the laminated packing material in cooperation with the sealing face of the horn. In this apparatus, a band-shaped ridge is disposed nearly at the center of the face of the horn butting against the portion to be sealed. A concave groove perpendicular to the ridge is disposed nearly at the center of the face of an anvil butting against the portion to be sealed. A bottom portion of the concave groove is made into a two-step structure and its step portion and both end portions are tapered. A protruded and inclined face of an acute angle extending sideward is provided at the end portion of the center of the bottom portion. The open portions at the top and bottom ends of a cylindrical liquid container are sealed with an overlapping bonding portion approximately at the center of the body consisting of the horn and opposing jaw or anvil (see Japanese Laid-Open Utility Model Application No. 147408/1988 and Registered Utility Model No. 3004786).

On the other hand, there is known a high-frequency heat sealing apparatus (Japanese Laid-Open Patent Application No. 230834/1996), wherein the molten resin remains in grooves without flowing out of the sealed zones, even if the resin on the packing material is melted and pushed by a ridge. In this arrangement, the ridge is formed in the longitudinal direction of an action face and high-frequency coils are used with the grooves formed parallel to the ridge on both sides of the ridge on the high-frequency heat sealing apparatus. There is additionally known a high-frequency heat sealing apparatus (Japanese Patent Publication No. 244728/1996), wherein the high-frequency coils are formed to incline gradually toward the farther direction as the sealed zone forming portion goes to the outer side (i.e., to the container's interior side). In this arrangement, the heat sealing is done such that liquid and the molten resin are discharged smoothly from the sealed zones to the container's interior side when the tube is pressed together, in the presence of a fluid, on the high-frequency heat sealing apparatus.

In order to achieve excellent heat sealing when transversely heat sealing a tubular packing material filled with contents such as liquid beverages, i.e. in the presence of the liquid, it is necessary to exclude the liquid from the sealed zones of the tube as much as possible when the tube is sealed with heat and under pressure. However, the tube inner face in contact with the liquid is not necessarily completely flat and has small asperities, if observed in detail. In the high-frequency heat sealing apparatus disclosed in Japanese Laid-Open Patent Application Nos. 134744/1983, 269854/1993, 164523/1995, 240607/1997 and 230834/1996, liquid or dirt enters the small asperities of the tube inner face and cannot be discharged to the outside of the sealed zones, so that the sealing property cannot be said to be adequate, as compared with a sealing method in which the molten resin can be prevented from flowing out of the sealed zone and thus is left in the sealed zones.

On the other hand, the inventors of the present invention have discovered that the liquid in the sealed zones may be guided to flow out of the sealed zones together with the molten resin so as to eliminate the liquid or dirt entered into the asperities when sealed, as disclosed in Japanese Laid-open Patent Application No. 244728/1996. The method using this heat sealing apparatus can completely eliminate liquid or dirt entering into the asperities to provide excellent sealing properties, but the molten resin flowing out to the side in contact with a fluid, which is the container's interior side, may not homogeneously extrude. As shown in FIG. 2, undulated molten resin beads 9 are formed on the edge portion of the container's interior side. At the secondary step using a shaping machine after the sealing step, it has been found out that cracks start from crests 10 of the undulations of the beads 9 and allow liquid leakage when pressure is applied to the container, although such leakage is not continuous. Problems with the high-frequency sealing apparatus are expected to occur almost similarly with the ultrasonic sealing apparatus, even considering the particularity of the ultrasonic sealing apparatus.

As to the particularity of the ultrasonic sealing apparatuses, i.e. the distinction from the high-frequency sealing apparatuses, the inventors of the present invention gained an insight as follows by preliminary experiments. In pressing the tubular packing material with an ultrasonic horn and an opposing jaw working together on the ultrasonic sealing apparatus, it was found that keeping the uniformity of the pulsation would be difficult, if configurations such as the grooves and an incline which increase the sealability are added on the sealing face of the ultrasonic horn, due to the additional asperities. Thus it would be impossible to apply an appropriate pressure on the intended sealing area of the tubular packing material. Further, in the case of ultrasonic sealing, as opposed to high-frequency sealing which can heat even the unpressed area, it was determined that a portion of the molten thermoplastic resin inevitably flows out to the side in contact with the fluid which is on the container's interior, because only the pressed area, which infallibly transmits the ultrasonic pulsation, is heated.

SUMMARY OF THE INVENTION

An object of the present invention is to provide an ultrasonic heat sealing apparatus having excellent sealability and which is capable of: infallibly applying pulsation by an ultrasonic wave generating device to zones to be sealed, sufficiently heating even the step portions around the longitudinal sealing portion, positively discharging contaminants such as juice pulp existing in the zones being sealed from the sealing zones together with the molten thermoplastic resin, and preventing formation of undulated molten resin beads by controlling the thickness and the width of the molten thermoplastic resin flowing out to the side in contact with the fluid contents.

In order to accomplish the above objects, the inventors of the present invention found that forming a structure which controls the flow of the molten thermoplastic resin on the action face of the opposing jaw, but not on the sealing face of the horn, makes it possible to infallibly apply the pulsation by an ultrasonic wave generating device to the zones to be sealed. Further, by disposing the grooves on the face of the opposing jaw which can form the molten thermoplastic resin bulges in the vicinal areas of the sides of the sealing zones in contact with a fluid makes it possible to positively discharge contaminants from the sealing zones together with the molten thermoplastic resin and to control the thickness and the width of the molten thermoplastic resin flowing out to the side in contact with a fluid. The invention is base on these principles.

The above and other objects are thus accomplished in accordance with the invention by the provision of an ultrasonic sealing apparatus for transversely ultrasonically sealing a packing material comprised of a laminated body including at least a thermoplastic resin layer having a tubular form and containing a fluid, the apparatus, comprising: a horn having an elongated and flat sealing face, the sealing face having a width; and an opposing jaw with at least one elongated action face including a single flat pressing portion opposite from the sealing face and extending across at least a majority of the width of the sealing face for pressing a surface of the packing material in cooperation with the sealing face of the horn to define a transverse sealing zone of the tubular packing material, the at least one action face of the opposing jaw further comprising at least one groove disposed to a side of the single flat pressing portion for forming a molten thermoplastic resin bulge in a vicinal area of the at least one sealing zone for being in contact with the fluid in the tubular packing material and to control the thickness and width of molten thermoplastic resin flowing out of the transverse sealing zone to a side in contact with the fluid.

According to a further feature of the invention, an additional groove is disposed on the action face of the opposing jaw, for forming a molten thermoplastic resin bulge in a vicinal area of a cutting side of the sealing zone. Alternatively, an incline may be disposed on the action face of the opposing jaw, which can allow the molten thermoplastic resin to flow out of the sealing zone to the cutting side. According to yet another feature of the invention, the width of the pressing portion on the action face is narrower than the width of the sealing face of the horn. According to another feature of the invention, the grooves are arcuate in cross section and have a depth smaller than one half of the width. According to another aspect of the invention, the laminated body comprises paper layers. In accordance with still another feature of the invention, the opposing jaw comprises a cutting device. According to another aspect of the invention, the tubular packing material is a tubular packing material formed into a tubular form with a sealing tape.

According to the invention, any laminated body containing a thermoplastic resin layer such as polyethylene as an inmost face capable of being heat sealed by means of heating may be used as the packing material comprising a laminated body containing at least the thermoplastic resin layer. However, one with paper layers such as a paper sheet for maintaining a rigidity of the container is desirable. It is also possible to use laminated bodies comprising an aluminum foil layer or an oxygen-impermeable synthetic resin film layer for preventing air, microbes or the like from permeating into the container. As the tubular packing material of the present invention, it is possible to use a packing material which is made into a tubular form using a sealing tape, in addition to a packing material made into the tubular form.

According to a further aspect of the invention there is provided a method method for transversely ultrasonically sealing a packing material comprised of a laminated body including at least a thermoplastic resin layer having a tubular form and containing a fluid, comprising: providing a horn having an elongated and flat sealing face; providing an opposing jaw having at least one elongated action face including a flat pressing portion and at least one groove disposed on the action face of the opposing jaw to a side of the flat pressing portion; and pressing the action face of the opposing jaw against the sealing face of the horn with the packing material sandwiched therebetween to a define at least one transverse sealing zone of the tubular packing material and concurrently forming a molten thermoplastic resin bulge in the groove of the action face in a vicinal area to a side of the at least one sealing zone in contact with the fluid in the tubular packing material.

DETAILED DESCRIPTION OF THE INVENTION

In the present invention, the apparatus in which the packing material formed into the tubular form is transversely ultrasonic sealed in the presence of a fluid may comprise any ultrasonic sealing apparatus so long as it comprises a horn having an elongated and flat sealing face, an opposing jaw having an action face including a pressing portion for pressing the packing material in cooperation with the sealing face of the horn, and grooves disposed on the action face of the opposing jaw which can form the molten thermoplastic resin bulges in the vicinal areas of the side of the sealing zones in contact with the fluid. It is thus possible to use a conventional ultrasonic sealing apparatus aside from the grooves being disposed on the action face of the opposing jaw.

Figure 1:
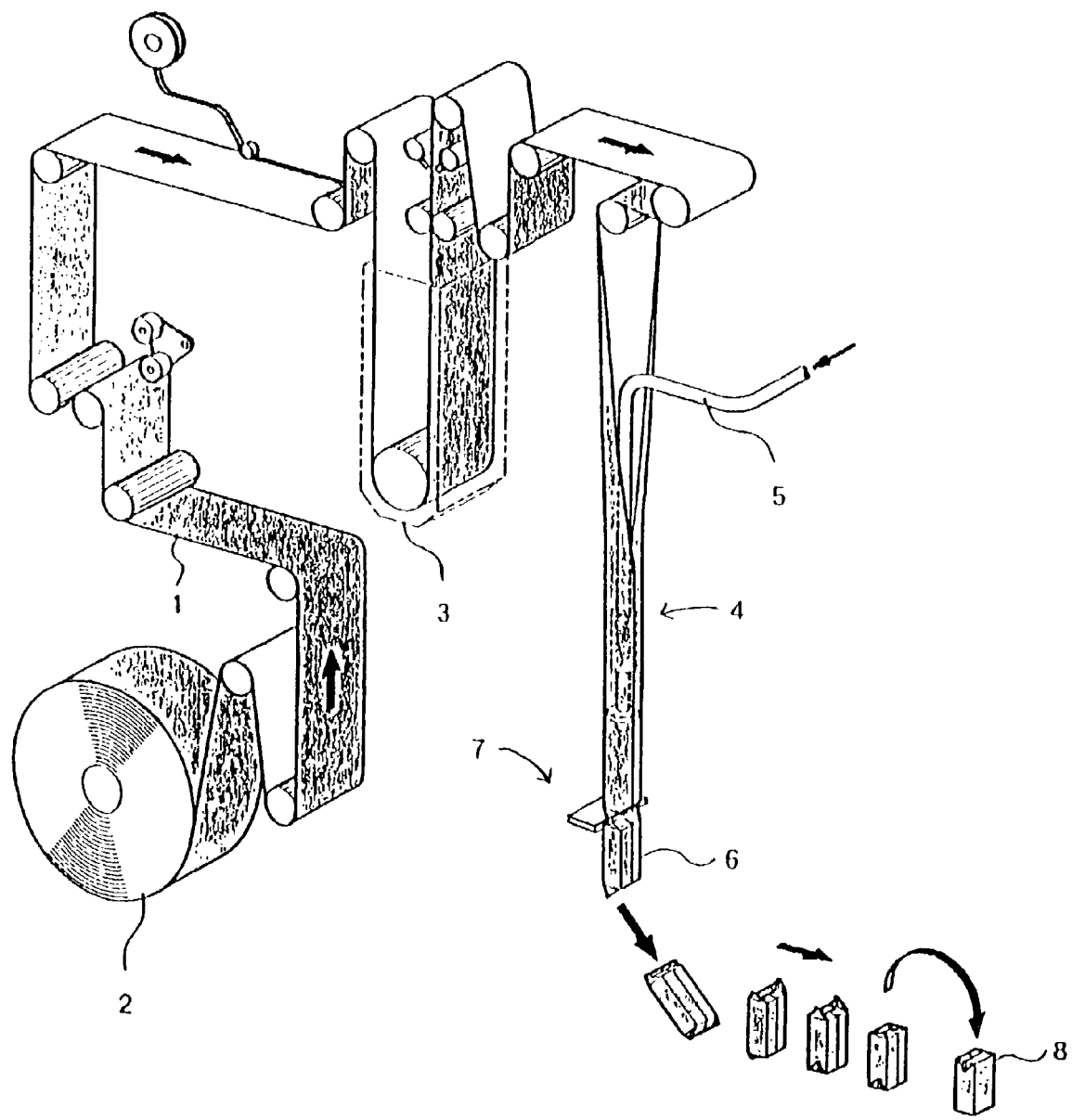
FIG. 1 is a schematic view useful for explaining a process for forming a paper packing container by a conventional filling/packing machine.
Figure 2:
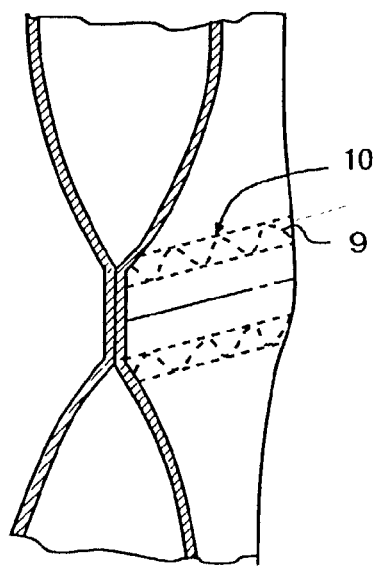
FIG. 2 is a schematic perspective view in partial section of a heat sealed portion of the packing material web created by using a conventional heat sealing apparatus.
Figure 3:
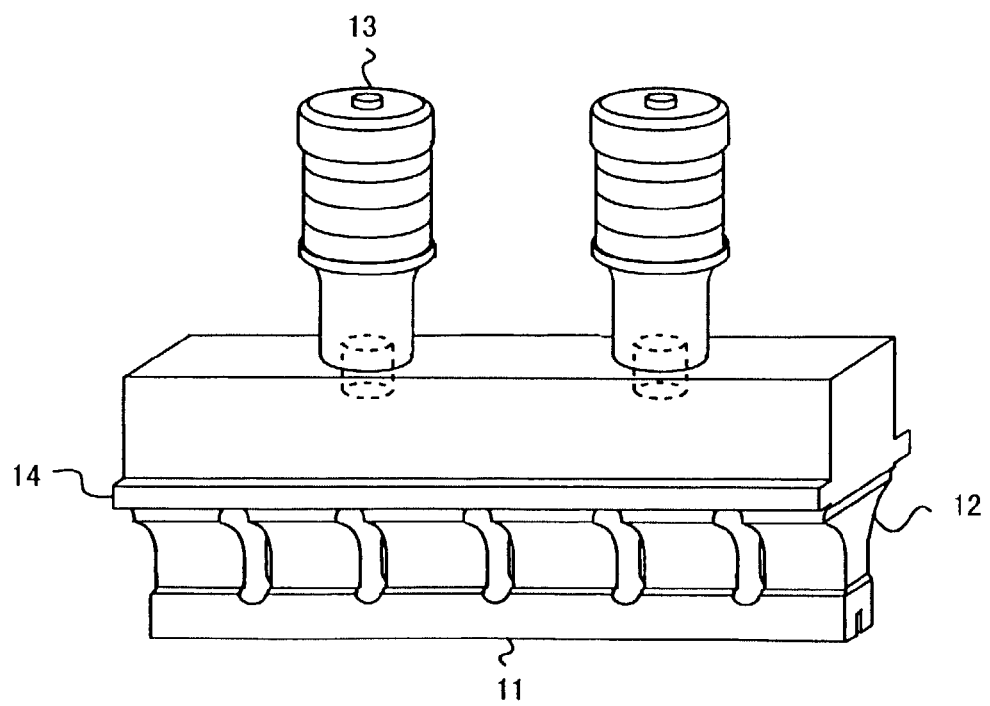
FIG. 3 is a schematic perspective view of an ultrasonic wave-generating device which can be used in an ultrasonic sealing apparatus of the present invention.
Figure 4:
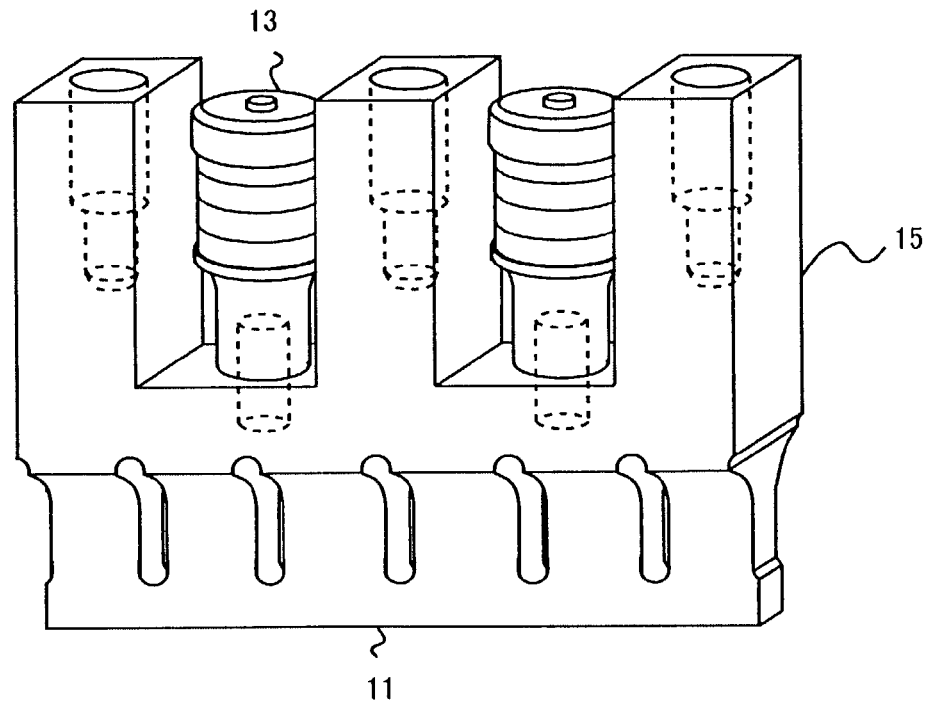
FIG. 4 is a schematic perspective view of an ultrasonic wave generating device of another embodiment which can be used in an ultrasonic sealing apparatus of the present invention.

For example, it is possible to concretely exemplify the ultrasonic sealing apparatus developed by the inventors of the present invention, as shown in FIG. 3, wherein there is provided at least one horn 12 with two elongated and flat sealing faces 11 for sealing the packing material in the longitudinal direction, plural converters 13 standing on the opposite side of the sealing faces of the horn 12, which resonate the horn, and a sealing jaw whose length is the length of one wavelength, and whose fixing position (attaching flange) 14 is a knot plane. According to another embodiment of the invention shown in FIG. 4, the ultrasonic sealing apparatus may comprise plural converters 13 provided standing on one horn-fixture integral, unitary body 15 which comprises one elongated and flat sealing face 11, for sealing the packing material in the longitudinal direction (WO99/48759). By using these ultrasonic sealing apparatuses with plural converters 13, it becomes possible to uniformly heat seal over the entire elongated sealing face including both end portions.

The sealing zones (or the sealed zones) in the present invention refer to the portions heat sealed from heat loaded by pressure and mechanical vibration onto the thermoplastic resin layer, which is the inmost face of the packing material, caused by the elongated and flat sealing face disposed on the edge of the horn and by the pressing portion pressing the packing material in corporation with the sealing face of the horn existing on the action face of the opposing jaw. Further, the intended portions to be heat sealed may be referred to as the sealing zones (or the sealed zones) as a matter of convenience. Therefore, the sealing zones are generally concordant with the pressing portions, thus making the vicinal area in the side in contact with a fluid, and the vicinal area of the cutting side where the packing container is to be cut off, to be formed on both outer sides of the sealing zones; and the sealed zones are continuously formed by using the ultrasonic sealing apparatus of the present invention. That is to say, in this kind of filling/packing machine comprising the ultrasonic sealing apparatus, generally two pairs of pressing members each comprising the sealing jaw and the opposing jaw are used; the two sealed zones are continuously formed by being heat sealed with the respective pairs of pressing members; and packing containers each formed into the pillow-shape are to be cut off between the two sealed zones.

The character of the ultrasonic sealing apparatus of the present invention is that the grooves that form the molten thermoplastic resin bulges in the vicinal area of the side of the sealing zones in contact with the fluid, are at least disposed on the action face of the opposing jaw. Namely, the molten thermoplastic resin bulges are formed in the vicinal area of the side of the sealing zones in contact with the fluid, by grooves disposed on the action face of the opposing jaw. It is also possible to re-characterize the grooves as grooves disposed on the non-pressing portions adjacent to the side of the pressing portion of the action face in contact with a fluid along with the pressing portion in its longitudinal direction. The best modes of the invention are the ultrasonic sealing apparatus wherein grooves that form the molten thermoplastic resin bulges are disposed in the vicinal area of the cutting side of the sealing zones on the action face of the opposing jaw in addition to grooves on the non-pressing face portion of the side in contact with a fluid, and the ultrasonic sealing apparatus wherein an incline is disposed in the vicinal area of the cutting side of sealing zones on the action face of the opposing jaw for the molten thermoplastic resin to flow out toward the direction away from the sealing zones.

By disposing grooves on the action face of the opposing jaw to form the molten thermoplastic resin bulges in the vicinal area of the side in contact with a fluid or the vicinal area of the cutting side of the sealing zones, there is provided excellent heat sealing to the sealing zones which does not have contaminants in the sealing zones, due to the thermoplastic resin in the sealing zones, which was melted by the pressure and the heat, and discharged out of the sealing zones at the time of ultrasonic heat sealing. Additionally, the undesirable formation of the undulated molten resin beads can be prevented due to the molten thermoplastic resin flowing out of the sealing zones at the side in contact with a fluid, and forming molten thermoplastic resin bulges with constant width and thickness in the vicinal area of the side of the sealing zones in contact with a fluid. Further, cutting becomes easy because the molten thermoplastic resin that flows out of the sealing zones of the cutting side forms molten thermoplastic resin bulges with constant width and thickness in the vicinal area of the cutting side of the sealing zones, and does not flow out to the cutting portion.

Any form of groove suffices for the grooves disposed on the action face of the opposing jaw, so long as the molten thermoplastic resin does not flow over the grooves toward the side in contact with a fluid. Desirably, the groove is provided with a structure in which the edge of the side of the molten thermoplastic resin that bulges in contact with the fluid becomes straight. For example, grooves with a shape such as a U-shape in cross section, V-shape in cross section, arcuate in cross section, are exemplary; and grooves which are arcuate in cross section with a depth smaller than one half of the width, for example, approximately one third are more desirable. Equally, it is desirable to preset the width and the depth of the grooves so that grooves are filled with the molten thermoplastic resin that flows out, and the molten thermoplastic resin bulges with sealed edges of uniform width. Cracks are not caused by the resulting molten thermoplastic resin bulges of uniform width, so that fractures from the ridge of the resin by an internal pressure of the container can be prevented.

Further, in lieu of the grooves disposed on the cutting side exterior of the pressing portion of the action face, it is also possible to provide excellent heat sealing without any contaminant in the sealed zone, by forming an incline for the molten thermoplastic resin to flow out toward the direction away from sealing zones, so that the molten thermoplastic resin in the sealing zones smoothly flows out of the cutting side of the sealing zones. Additionally, by so disposing the incline, the flow of the molten thermoplastic resin going out of the side of the sealing zones in contact with a fluid can be controlled; especially the flow at the longitudinal sealing portion where the sealing tape melts can be controlled, thus preventing the molten thermoplastic resin from flowing over the grooves disposed on the side of the action face in contact with a fluid into the filling fluid.

When the ultrasonic sealing apparatus of the present invention is used to heat seal, the width of the sealing zones, as aforementioned, generally matches the width of the pressing portions of the action face of the opposing jaw, while there is a mode in which the width of the pressing portions matches the width of the sealing faces of the horn, and a mode in which the width of the pressing portions is narrower than the width of the sealing faces due to the grooves for the resin bulges and/or the incline. In any event, the pressing portion of the action face of the opposing jaw has a width that extends across at least a majority of the width of the sealing face of the horn (see FIGS. 5 and 6). The ultrasonic sealing apparatuses comprising all of the foregoing modes are included in the present invention. Further, in the ultrasonic sealing apparatus of the present invention, it is also possible to dispose continuous or discontinuous ridges on the pressing portions in correspondence to the sealing zones on the action face of the opposing jaw. The discontinuous ridges are disposed around the longitudinal sealing portions or on both exterior portions where the packing material is bent over, both of which cause steps and make the sealing pressure to be uneven, thereby preventing a sealing failure caused by tunnels from occurring.

Further, as aforementioned, in the ultrasonic sealing apparatus of the invention, a cutting device composed of a cutting edge and a driving means is generally disposed on the opposing jaw, because packing containers which are formed into a pillow-shape are to be cut off between the two sealed zones formed by heat sealing with a set of pressing members composed of a sealing jaw and an opposing jaw. Equally, as mentioned above, this cutting by the cutting device is normally done between the two sealed zones; however, a cutting apparatus can also be disposed below the ultrasonic sealing apparatus in order to cut approximately at the center of the broad sealed zones.

Figure 5:
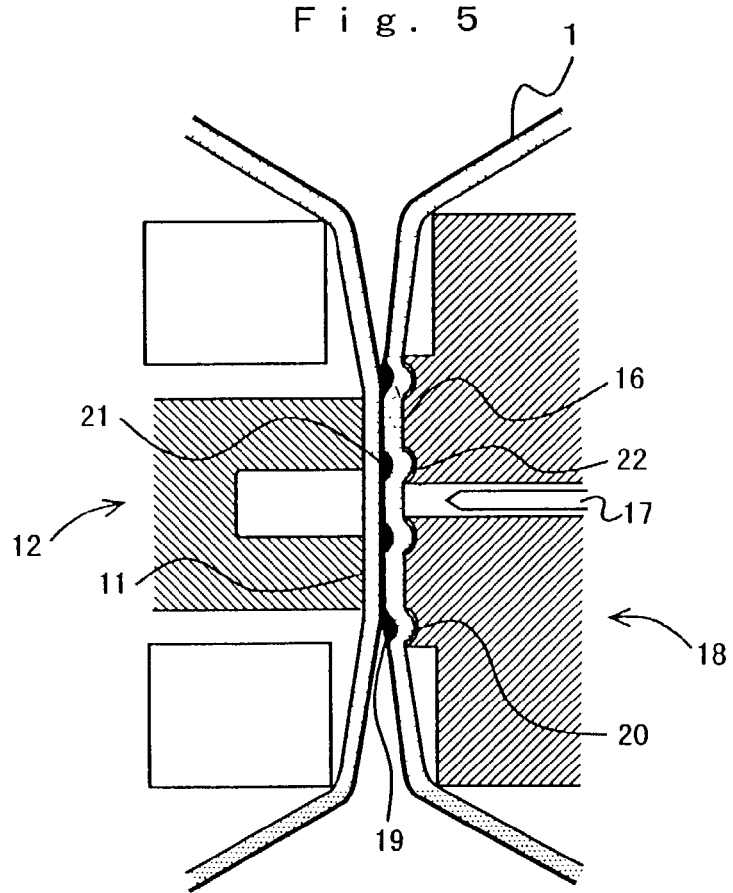
FIG. 5 is a schematic longitudinal section of an ultrasonic sealing apparatus of the present invention.
Figure 6:
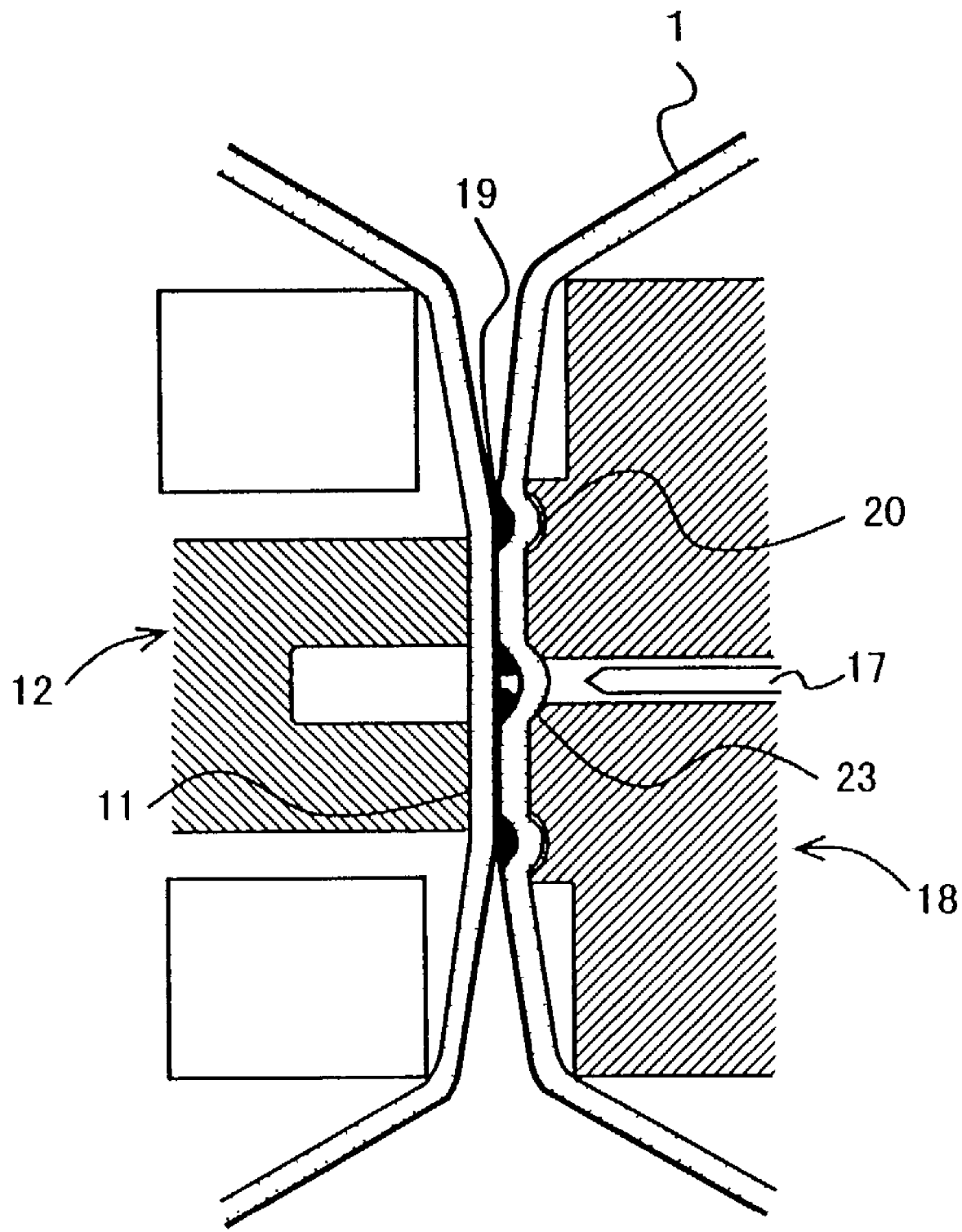
FIG. 6 is a schematic longitudinal section of an ultrasonic sealing apparatus of another embodiment of the present invention.

Heat sealing apparatuses according to the present invention will be described hereunder with reference to FIGS. 5 and 6. Ultrasonic sealing apparatuses of the present invention, as shown in FIGS. 5 and 6, employ a laminated packing material web 1 comprising thermoplastic resin layers and paper layers. A horn 12 has two elongated and flat sealing faces 11. An opposing jaw 18 has an elongated action face 16, which includes the pressing portions to press the packing material in corporation with the sealing faces of the horn, and a cutting device 17. As shown in FIG. 5, action face 16 of opposing jaw 18 includes grooves 20 that form molten thermoplastic resin bulges 19 in the vicinal area of the side of the sealed zones in contact with a fluid and grooves 22 that form molten thermoplastic resin bulges 21 in the vicinal area of the cutting side of the sealed zones. In the ultrasonic sealing apparatus shown in FIG. 6, action face 16 of opposing jaw 18 includes grooves 20 that form the molten thermoplastic resin bulges 19 in the vicinal area of the side of the sealed zones in contact with a fluid, and inclines 23 that allow the molten thermoplastic resin to flow out of the sealing zones to the cutting side.

According to the present invention, even the step portions around the longitudinal-sealed portions can be sufficiently heated by infallibly applying pulsation of the ultrasonic wave generating devices to the sealing zones; contaminants such as juice pulp existing in the sealing zones can be positively discharged from the sealing zones together with the molten thermoplastic resin; by controlling the thickness and the width of the molten resin that flows out to the side in contact with a fluid, formation of the undulated molten resin beads can be prevented; as a result thereof, an excellent ultrasonic heat sealing can be achieved.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An ultrasonic sealing apparatus for transversely ultrasonically sealing a packing material comprised of a laminated body including at least a thermoplastic resin layer having a tubular form and containing a fluid, the apparatus, comprising:
    a horn having an elongated and flat sealing face, the sealing face having a width; and
    an opposing jaw with at least one elongated action face including a single flat pressing portion opposite from the sealing face and extending across at least a majority of the width of the sealing face for pressing a surface of the packing material in cooperation with the sealing face of the horn to define a transverse sealing zone of the tubular packing material, the at least one action face of the opposing jaw further comprising at least one groove disposed to a side of the single flat pressing portion for forming a molten thermoplastic resin bulge in a vicinal area of the at least one sealing zone for being in contact with the fluid in the tubular packing material and to control the thickness and width of molten thermoplastic resin flowing out of the transverse sealing zone to a side in contact with the fluid.

2. The ultrasonic sealing apparatus according to claim 1, wherein the sealing zone has a cutting side, and the apparatus further comprises a groove disposed on the action face of the opposing jaw for forming a molten thermoplastic resin bulge in a vicinal area of the cutting side of the sealing zone.

3. An ultrasonic sealing apparatus according to claim 2, wherein each groove is arcuate in cross section and has a depth smaller than one half of its width.

4. An ultrasonic sealing apparatus according to claim 1, wherein the sealing zone has a cutting side and the apparatus further comprises an incline disposed on the action face of the opposing jaw for allowing the molten thermoplastic resin to flow out from the sealing zone to the cutting side.

5. An ultrasonic sealing apparatus according to claim 1, wherein the pressing portion has a width that is narrower than the sealing face.

6. An ultrasonic sealing apparatus according to claim 1, wherein the at least one groove is arcuate in cross section and has a depth smaller than one half of its width.

7. An ultrasonic sealing apparatus according to claim 1, wherein the opposing jaw comprises a cutting device.

8. A method for transversely ultrasonically sealing a packing material comprised of a laminated body including at least a thermoplastic resin layer having a tubular form and containing a fluid, comprising:

providing a horn having an elongated and flat sealing face;

providing an opposing jaw having at least one elongated action face including a flat pressing portion and at least one groove disposed on the action face of the opposing jaw to a side of the flat pressing portion; and pressing the action face of the opposing jaw against the sealing face of the horn with the packing material sandwiched therebetween to define at least one transverse sealing zone of the tubular packing material and concurrently forming a molten thermoplastic resin bulge in the groove of the action face in a vicinal area to a side of the at least one sealing zone in contact with the fluid in the tubular packing material.

9. The method of claim 8, wherein the at least one sealing zone has a cutting side, and the step of providing an opposing jaw includes providing a groove on the action face of the opposing jaw for forming a molten thermoplastic resin bulge in a vicinal area of the cutting side of the sealing zone.

10. The method of claim 9, wherein the step of providing an opposing jaw includes providing each groove with an arcuate cross section and with a depth smaller than one half of its width.

11. The method of claim 8, wherein the at least one sealing zone has a cutting side and the step of providing an opposing jaw further comprises providing an incline on the action face of the opposing jaw for allowing the molten thermoplastic resin to flow out from the sealed zone to the cutting side.

12. The method of claim 8, including providing the pressing portion with a width that is narrower than the sealing face.

13. The method of claim 8 wherein the step of providing the opposing jaw includes providing the at least one groove with an arcuate cross section and with a depth smaller than one half of its width.

14. The method of claim 8 wherein the laminated body comprises paper layers.

15. The method of claim 8, wherein the step of providing an opposing jaw includes providing the opposing jaw with a cutting device.

16. The method of claim 8 including making the tubular packing material from a packing material formed into the tubular form with a sealing tape along longitudinal edges of the packing material.

* * * * *